US009088697B2

(12) United States Patent
Vivekanandan et al.

(10) Patent No.: US 9,088,697 B2
(45) Date of Patent: Jul. 21, 2015

(54) PROCESSING MEDIA STREAMS DURING A MULTI-USER VIDEO CONFERENCE

(75) Inventors: Janahan Vivekanandan, Los Altos, CA (US); Frank Petterson, Redwood City, CA (US); Thor Carpenter, Snoqualmie, WA (US); John David Salazar, Kirkland, WA (US)

(73) Assignee: Google Inc., Mountain View, CA (US)

( * ) Notice: Subject to any disclaimer, the term of this patent is extended or adjusted under 35 U.S.C. 154(b) by 617 days.

(21) Appl. No.: 13/324,897

(22) Filed: Dec. 13, 2011

(65) Prior Publication Data

US 2013/0147905 A1    Jun. 13, 2013

(51) Int. Cl.
*H04N 7/14* (2006.01)
*H04N 7/15* (2006.01)

(52) U.S. Cl.
CPC ............... *H04N 7/157* (2013.01); *H04N 7/155* (2013.01)

(58) Field of Classification Search
CPC ............. H04M 7/0027–7/0057; H04M 9/001; H04M 1/253–1/2535; H04M 1/72547–1/72558
USPC .................... 348/14.01–14.16; 370/259–271, 370/351–357; 379/52, 67.1–88.28, 90.01, 379/93.13, 101.01, 167.01, 201.01, 202.01, 379/207.01, 419–456; 704/270–278; 709/201–207, 217–248; 455/412.1–426.2, 456.1–466, 455/550.1–560, 575.1–575.9, 90.1–90.3
See application file for complete search history.

(56) References Cited

U.S. PATENT DOCUMENTS

| | | | |
|---|---|---|---|
| 5,736,982 A | 4/1998 | Suzuki et al. | |
| 5,995,119 A | 11/1999 | Cosatto et al. | |
| 6,683,938 B1 * | 1/2004 | Henderson | 379/67.1 |
| 6,751,340 B2 | 6/2004 | Prokoski | |
| 7,139,767 B1 | 11/2006 | Taylor et al. | |
| 7,227,976 B1 | 6/2007 | Jung et al. | |
| 2002/0110224 A1 * | 8/2002 | Kovales et al. | 379/67.1 |
| 2002/0196370 A1 | 12/2002 | Dagtas et al. | |
| 2005/0248582 A1 | 11/2005 | Scheepers et al. | |
| 2006/0107303 A1 * | 5/2006 | Erhart et al. | 725/135 |
| 2006/0221083 A1 | 10/2006 | Guitarta | |
| 2007/0200925 A1 * | 8/2007 | Kim | 348/14.08 |
| 2007/0223668 A1 * | 9/2007 | Blumenfeld et al. | 379/201.01 |
| 2009/0100484 A1 | 4/2009 | Chalwat | |
| 2009/0151741 A1 | 6/2009 | Ngo | |
| 2011/0090301 A1 * | 4/2011 | Aaron et al. | 348/14.08 |
| 2011/0150200 A1 * | 6/2011 | Uhler et al. | 379/202.01 |
| 2012/0169835 A1 * | 7/2012 | Woo | 348/14.09 |
| 2012/0323579 A1 * | 12/2012 | Gibbon et al. | 704/270 |
| 2013/0044180 A1 | 2/2013 | Shintani | |

OTHER PUBLICATIONS

International Search Report and Written Opinion, dated Apr. 5, 2013, for related PCT Application No. PCT/US2012/69312.

(Continued)

*Primary Examiner* — Hemant Patel
(74) *Attorney, Agent, or Firm* — IP Spring (57) ABSTRACT

Embodiments generally relate to processing media streams during a multi-user video conference. In one embodiment, a method includes obtaining at least one audio file and obtaining one or more parameters from a remote user. The method also includes adding user-specified audio content from the at least one audio file to a media stream based on the one or more parameters.

19 Claims, 6 Drawing Sheets

(56) References Cited

OTHER PUBLICATIONS

IP Australia; Related AU application No. 2012327202; Patent Examination Report No. 1; dated Jul. 14, 2014; 3 pages.

USPTO; Related co-pending U.S Appl. No. 13/324,897; prosecution history; Notice of allowance dated Dec. 17, 2014, Final Office Action dated Sep. 4, 2014, First Interview Office Action dated Jun. 30, 2014; Pre-interview Office Action dated Apr. 25, 2014.

* cited by examiner

PROCESSING MEDIA STREAMS DURING A MULTI-USER VIDEO CONFERENCE

CROSS REFERENCE TO RELATED APPLICATIONS

The present application is related to co-pending U.S. patent application Ser. No. 13/324,886, filed on Dec. 13, 2011 entitled "Processing Media Streams During a Multi-User Video Conference," which is incorporated by reference herein.

TECHNICAL FIELD

Embodiments relate generally to video conferencing, and more particularly to processing media streams during a multi-user video conference.

BACKGROUND

Video conferencing is often used in business settings and enables participants to share video and audio content with each other in real-time across geographically dispersed locations. A communication device at each location typically uses a video camera and microphone to send video and audio streams, and uses a video monitor and speaker to play received video and audio streams. Video conferencing involves digital compression of video and audio streams, which are transmitted in real-time across a network from one location to another. The communication devices perform the compressing and decompressing of the video and audio streams, and maintain the data linkage via the network.

SUMMARY

Embodiments generally relate to processing media streams during a multi-user video conference. In one embodiment, a method includes obtaining at least one audio file and obtaining one or more parameters from a remote user. The method also includes adding user-specified audio content from the at least one audio file to a media stream based on the one or more parameters.

DETAILED DESCRIPTION

Embodiments described herein increase end-user engagement in a social network by enabling end-users to add media content items to media streams. For example, an end-user may add images or videos to frames of media streams and add audio content to the media streams in real-time during a multi-user video conference. As described in more detail below, in one embodiment, a system obtains one or more frames from a media stream, which may include video streams, audio streams, outbound streams, and inbound streams. The one or more frames may include a face of a user. The system determines coordinates within the one or more frames using a face detection algorithm, where the coordinates are facial coordinates. The system also obtains an image, which can come from the system, a third-party application, or an end-user. The system also obtains one or more parameters from a remote user, which may be a third-party developer or an end-user. Such parameters may include, for example, where to place the image in the one or more frames.

The system then adds the image to the one or more frames based on the coordinates and the one or more parameters. In one embodiment, the system may add the image by overlaying the image on the one or more frames. In another embodiment, the system may add the image by replacing at least a portion of the one or more frames with the image. The system scales and rotates the image based on each of the one or more frames. The system may preload images and associated parameters prior to adding the image to media streams.

In one embodiment, the system also enables the end-users to add video content by decoding and overlaying video stream on to the media stream. The system may preload video files that include video content and preload associated parameters prior to adding the video content to media streams.

In one embodiment, the system also enables end-users to add audio content to media streams in real-time. The system may also preload audio files that include audio content and preload associated parameters prior to adding the audio content to media streams.

Figure 1:
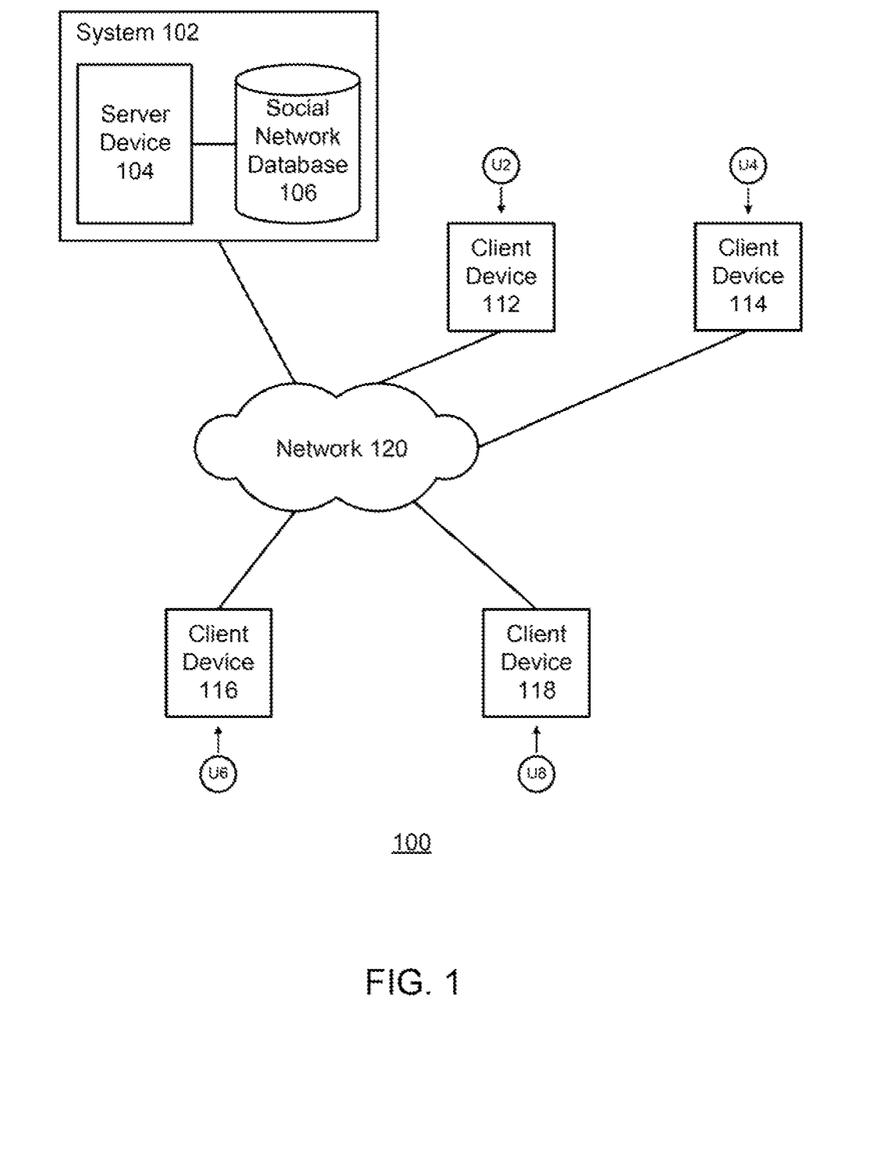
FIG. 1 illustrates a block diagram of an example network environment, which may be used to implement the embodiments described herein.

FIG. 1 illustrates a block diagram of an example network environment 100, which may be used to implement the embodiments described herein. In one embodiment, network environment 100 includes a system 102, which includes a server device 104 and a social network database 106. Network environment 100 also includes client devices 112, 114, 116, and 118, which may communicate with each other via system 102 and a network 120.

For ease of illustration, FIG. 1 shows one block for each of system 102, server device 104, social network database 106, and shows four blocks for client devices 112, 114, 116, and 118. Blocks 102, 104, and 106 may represent multiple systems, server devices, and social network databases. Also, there may be any number of client devices. In other embodiments, network environment 100 may not have all of the components shown and/or may have other elements including other types of elements instead of, or in addition to, those shown herein.

In various embodiments, end-users U2, U4, U6, and U8 may communicate with each other using respective client devices 112, 114, 116, and 118. For example, end users U2, U4, U6, and U8 may interact with each other in a multi-user video conference, where respective client devices 112, 114, 116, and 118 transmit media streams to each other.

In various embodiments, the media streams may include different types of media streams (e.g., one or more video streams and/or one or more audio streams). For example, such media streams may include video streams that display end-users U2, U4, U6, and U8, and may include associated audio streams. Also, the media streams may include media streams being transmitted in different directions (e.g., one or more outbound streams and/or one or more inbound streams) relative to each client device 112, 114, 116, and 118.

Figure 2:
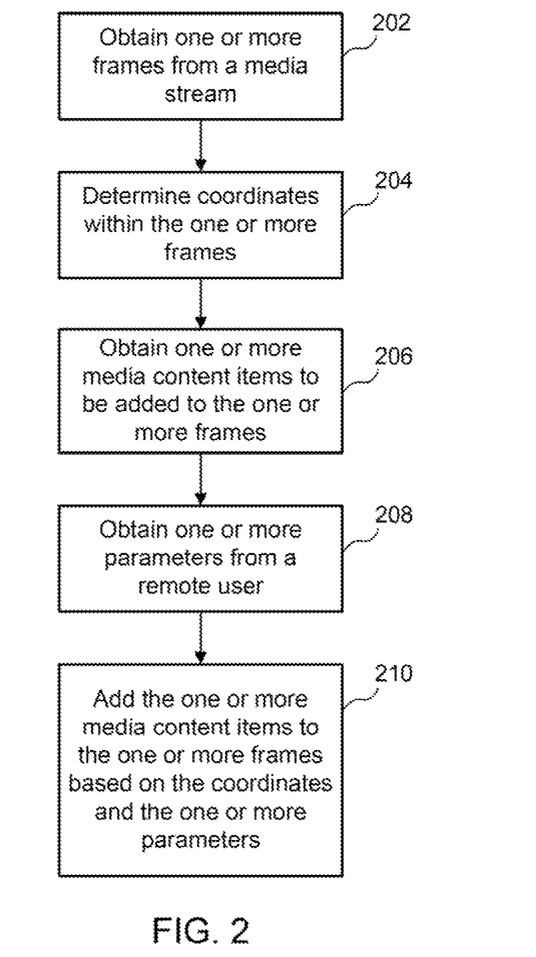
FIG. 2 illustrates an example simplified flow diagram for increasing end-user engagement in a social network, according to one embodiment.

FIG. 2 illustrates an example simplified flow diagram for increasing end-user engagement in a social network, according to one embodiment. Referring to both FIGS. 1 and 2, the method is initiated in block 202, where system 102 obtains one or more frames from a media stream. As indicated above, the media stream may include one or more video streams and/or one or more audio streams, and the media stream may include one or more outbound streams and/or one or more inbound streams. Various example applications involving these different types of streams are described in more detail below. In various embodiments, the media stream may be a media stream in a multi-user video conference.

Figure 3:
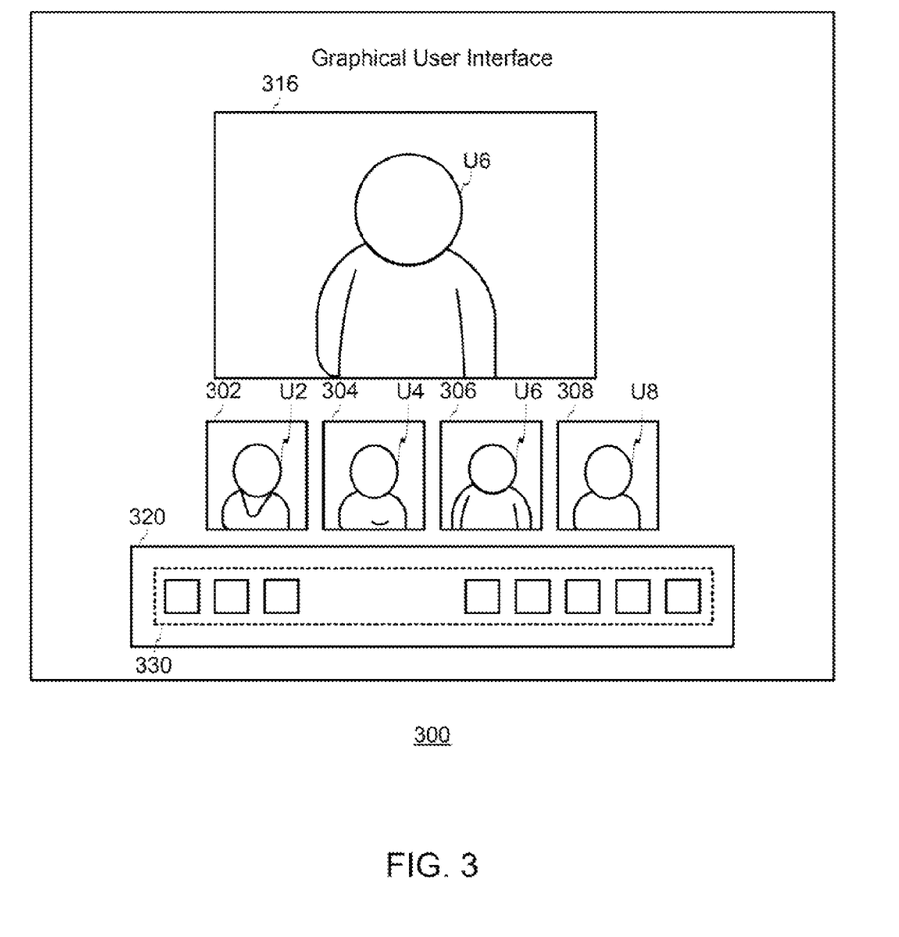
FIG. 3 illustrates an example simplified graphical user interface (GUI), according to one embodiment.

FIG. 3 illustrates an example simplified graphical user interface (GUI) 300, according to one embodiment. In one embodiment, GUI 300 includes video windows 302, 304, 306, and 308, which display video streams of respective end-users U2, U4, U6, and U8 who are participating in the multi-user video conference. For ease of illustration, four end-users U2, U4, U6, and U8 are shown. In various implementations, there may be various numbers of end-users participating in a multi-user video conference.

In one embodiment, GUI 300 includes a main video window 316, which displays a video stream of the user who is currently speaking. As shown in FIG. 3, in this particular example, main video window 316 is displaying a video stream of end-user U6, who is the current speaker. In one embodiment, main video window 316 is a larger version of the corresponding video window (e.g., video window 306). In one embodiment, main video window 316 may be larger than the other video windows 302, 304, 306, and 308, and may be centralized in the GUI to visually indicate that the end-user shown in main video window 316 is speaking. In one embodiment, the video stream displayed in main video window 316 switches to a different video stream associated with another end-user each time a different end-user speaks.

In one embodiment, GUI 300 also includes a control window 320, which includes control buttons 330 (enclosed in dotted lines). For ease of illustration, eight control buttons are shown. The number of control buttons may vary depending on the specific implementation. The functionality of control buttons 330 also vary depending on the specific implementation. Various functions of control buttons 330 are described in more detail below.

Referring still to FIGS. 1 and 2, in block 204, system 102 determines coordinates within one or more frames. In one embodiment, system 102 may determine coordinates using a face detection algorithm. For example, system 102 passes the one or more frames through the face detection algorithm, and the face detection algorithm calculates coordinates of various visual elements of the frame. For ease of illustration, such visual elements may be referred to as background images or base images.

In a given frame, such base images may include, for example, the face of a user, and such coordinates within the given frame may be referred to facial coordinates. In one embodiment, the face of the user may include the head, eyes, nose, ears, and mouth of the user, etc. These base images are examples, and other embodiments may not have all the base images listed and/or may have other base images instead of, or in addition to, those listed above (e.g., hair, glasses, clothing, etc.).

The coordinates specify where these base images are located in the one or more frames. In one embodiment, the coordinates may include Cartesian coordinates or coordinates of any other suitable coordinate system to show the location of each base image in the frame. In various embodiments, system 102 may determine coordinates using various algorithms. For example, system 102 may determine coordinates associated with sections of the least one frame. Such sections may include, for example, four quadrants in a given frame, or any predetermined number of sections and/or predetermined areas of a given frame. In one embodiment, system 102 may determine coordinates associated with particular locations of pixels or groups of pixels in a given frame.

In block 206, system 102 obtains one or more media content items to be added to the one or more frames. In one embodiment, the one or more media content items are user-specified media content items that may include one or more user-specified images and/or one or more user-specified video content items. For example, in one embodiment, the one or more media content items may include at least one image (e.g., antlers). In one embodiment, the one or more media content items may include two or more different images (e.g., antlers and a mustache). In one embodiment, the one or more media content items may include at least one video (e.g., video displaying a sleigh being pulled by reindeer). In one embodiment, the one or more media content items may include two or more videos (e.g., video displaying a sleigh being pulled by reindeer and a star). In various embodiments, system 102 may obtain any combination of these media content items (e.g., one or more images, and/or one or more videos, etc.).

In one embodiment, the media content items, whether images or videos, are media content items that an end-user might want to add to frames of media streams during a multi-user video conference. For example, images to be added may include a mustache, eye glasses, hats, antlers, etc. Videos to be added may include a sleigh being pulled by reindeer, a star twinkling in the sky, snow falling from the sky, etc.

In various embodiments, system 102 may obtain the one or more media content items from a memory or library of system 102, from the Internet, or any other location. System 102 may also obtain the image from a third-party application or an end-user (e.g., end-users U2, U4, U6, and U8). Images may be stored as image files, and videos may be stored as video files. In one embodiment, an end-user may provide the one or more media content items to system 102 using a third-party application or using an application provided by system 102.

In block 208, system 102 obtains one or more parameters from a remote user. In one embodiment, the remote user is a user who is remote from system 102. For example, in one embodiment, the remote user may be a third-party developer. In one embodiment, the third-party developer may use a third-party application or an application provided by system 102 to transmit the one or more parameters to system 102. In another embodiment, the remote user may be an end-user (e.g., end-users U2, U4, U6, and U8). In one embodiment, the end-user may use a third-party application or an application provided by system 102 to transmit the one or more parameters to system 102.

In various embodiments, system 102 enables the remote user to specify with one or more parameters the location where the image is to be added to the frame. For example, the remote user may specify that a given image such as antlers is to be added to specific coordinates in the frame (e.g., coordinates at the top of a head shown in the frame). Parameters may also include offset parameters. For example, a remote user may specify that an image such as a mustache be added at a predetermined number of pixels or at a predetermined distance above the lips in a frame. For ease of illustration, other parameters are described in detail below.

In block 210, system 102 adds the one or more content items to the one or more frames based on the coordinates and the one or more parameters. In various embodiments, system 102 performs the adding of the one or more content items in real-time during a multi-user video conference.

Although the steps, operations, or computations may be presented in a specific order, the order may be changed in particular embodiments. For example, in one embodiment, system 102 may obtain the image and one or more parameters before obtaining the one or more frames and determining the coordinates. In another embodiment, system 102 may obtain the one or more parameters and one or more frames, and determine coordinates before obtaining the image. In another embodiment, system 102 may obtain the one or more parameters before obtaining the image. Other orderings of the steps are possible, depending on the particular implementation. In some particular embodiments, multiple steps shown as sequential in this specification may be performed at the same time.

Figure 4:
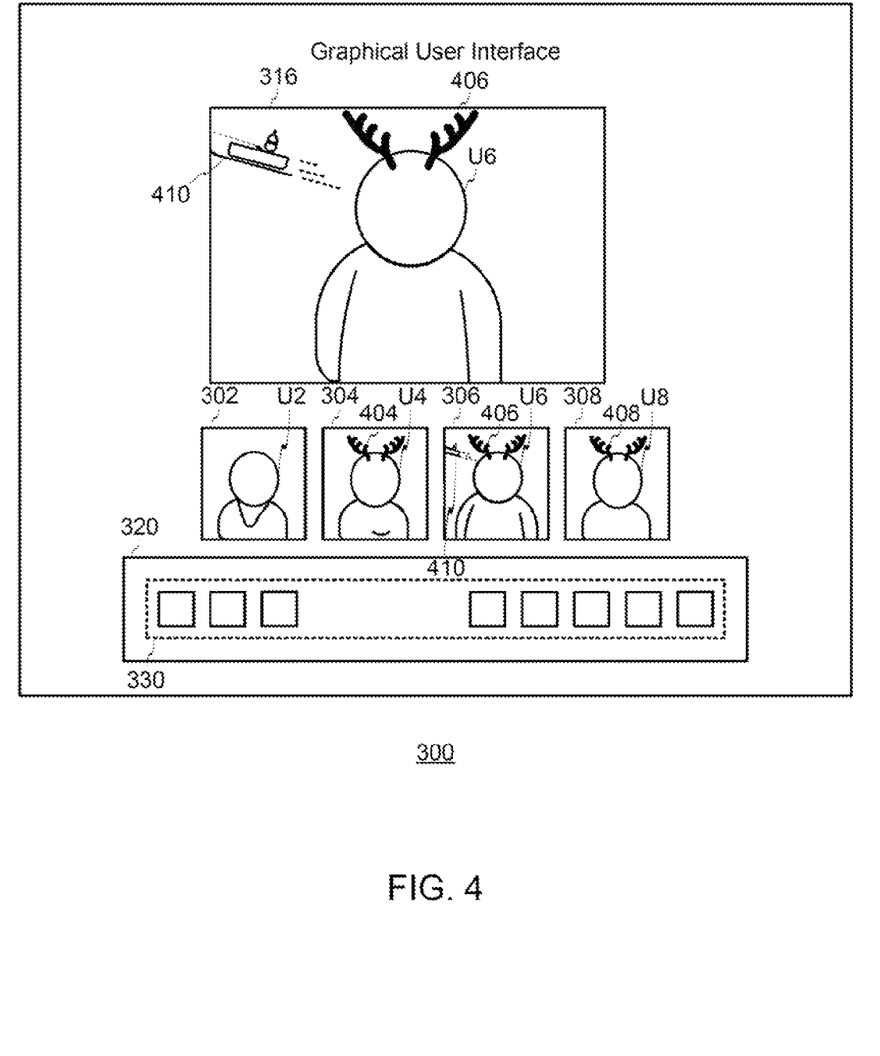
FIG. 4 illustrates an example GUI, according to one embodiment.

FIG. 4 illustrates the example GUI 300 of FIG. 3, according to one embodiment. FIG. 4 shows GUI 300, and video windows 302, 304, 306, and 308, which display video streams of respective end-users U2, U4, U6, and U8. FIG. 4 also shows main video window 316, which displays a video stream of user U6, who is currently speaking FIG. 4 also shows control window 320, which includes control buttons 330.

As shown in FIG. 4, system 102 has added an image of antlers 404, 406, and 408 to the frames of the video streams displayed in video windows 304, 306, and 308, as well as in the video stream displayed in main video window 316. In one embodiment, system 102 performs the adding of the image when system 102 receives a command from an end-user to add the image. While many example embodiments described herein are described in the context of images, embodiments described herein also apply to video content. For example, FIG. 4 also shows a sleigh 410 being pulled across main video window 316 and corresponding video window 306. In one embodiment, sleigh 410 is video content that system 102 adds to a video stream. Further embodiments involving video content are described in more detail below.

Furthermore, while many example media content items are described herein in the context of images and video content, media content items may also include audio content. For example, the method embodiments described in connection to FIG. 2 may also include steps enabling an end-user in a multi-user video conference to also add audio content to the media stream. For example, in one embodiment, system 102 may obtain one or more audio files, and add audio content from the one or more audio files to the media stream based on the one or more parameters. Other embodiments for adding audio content to media streams are described in detail below in connection with FIG. 5.

In this particular example, system 102 has received the command from end-user U2, who desired to add antlers to the heads of end-users U4, U6, and U8. In various embodiments, end-user U2 may provide the command to system 102 by using control buttons 330 in control window 320. For example, one of the control buttons 330 may have a label that reads "antlers." As such, as end-user U2 selects or clicks that control button 330, system 102 adds antlers to the frames associated with the other end-users U4, U6, and U8. In one embodiment, end-user U2 may remove the image by again selecting or clicking (e.g., toggling) the same control button 330.

In one embodiment, different control buttons 330 may be associated with different images that may be added to frames of the video streams. In one embodiment, one of the control buttons 330 may be selected to display a drop-down menu (or any suitable selection mechanism), and the drop-down menu may display additional control buttons for various images that may be added to the frames of video streams.

As indicated above, embodiments enable an end-user, via system 102, to modify frames of different types of streams (e.g., video streams, audio streams, etc.) and streams being transmitted in different directions (e.g., outbound streams and/or inbound streams).

In one embodiment, each end-user can use control buttons 330 to specify the device where a particular image is to be added to the one or more frames. For example, an end-user may specify that the image (e.g., antlers) is to be added at one or more receiving client devices. As such, system 102 causes the client device of each end-user to add the image. Alternatively, the end-user may specify that the image (e.g., antlers) is to be added at the sending client device. As such, system 102 causes the sending client device to add the image, where the sending device broadcasts the video streams with the image already added to the frames of the broadcasted video stream. The end-user may make these selections using the appropriate control buttons 330.

In one embodiment, if a control button 330 for adding an image is selected, system 102 may display a drop-down menu listing all end-users currently participating in the multi-user video conference. The end-user who selected the control button may select which client devices add the image by selecting the control buttons 330 associated with the corresponding end-users.

In another embodiment, the end-user who selected the control button 330 may also select which end-users can see the added image. For example, an end-user (e.g., end-user U2) may select a control button 330 so that all end-users (e.g., end-users U2, U4, U6, and U8) see the image (e.g., antlers 404, 406, and 408). Alternatively, the end-user (e.g., end-user U2) may select a control button 330 so that selected end-users (e.g., end-users U2 and U4) see the image. In one embodiment, if a control button 330 for adding an image is selected, system 102 may display a drop-down menu listing all end-users currently participating in the multi-user video conference. The end-user who selected the control button may then select which end-users can see the image. In the example shown in FIG. 4, system 102 shows antlers 404, 406, and 408 in respective video windows 304, 306, and 308, and in main video window 316, but not in video window 302.

In one embodiment, system 102 may preload media content (e.g., images, video content, audio content) and parameters prior to adding the media content during a multi-user video conference. For example, system 102 may preload media content items and parameters before a given multi-user video conference begins. This minimizes latency so that when the multi-user video conference begins, system 102 is ready to add media content items in real-time as soon as system 102 receives commands to add the media content items.

In one embodiment, if a particular media content item (e.g., an image) is not preloaded, system 102 may search the Internet or any suitable source of the media content item in real-time after receiving a command to add a particular media content item. The time to find the media content item may vary (e.g., 10 ms, 1 second, or more), depending on the network speed. In one embodiment, after finding the media content item, system 102 may immediately add the media content item to the frames or may first prompt the end-user for an approval or command to add the media content item. In one embodiment, a control button 330 may already have an identifier associated with a media content item to be obtained from any suitable source (e.g., server 102, third-party application, or end-user). In another embodiment, a control button 330 when selected may cause a field to be displayed, where the end-user may type in an identifier (e.g., "antlers").

While embodiments above are described in the context of a single frame, implementations of such embodiments extend to multiple frames, such as a series of frames in a video stream. In one embodiment, server 102 tracks changes in frames in order to adjust images that were added to those frames. Server 102 performs these adjustments in real-time. For example, if the base image (e.g., head) of the frame moves up or down from frame to frame, the added image (e.g., antlers) moves up or down, accordingly. Also, if the base image (e.g., head) of the frame moves left or right from frame to frame, the added image (e.g., antlers) moves left or right, accordingly.

In one embodiment, system 102 may enable the remote user to specify various parameters that may affect such adjustments. For example, the remote user may specify that system 102 make such adjustments of the added image as quickly as the next frame changes. Such quick adjustments may require more system resources but would minimize jitter in the video stream.

In one embodiment, system 102 scales an added media content item (e.g., added image) based on the frame. For example, if a given user moves closer to the user's camera, the user's face would become bigger relative to the size of the video window. System 102 scales the added media content item accordingly. For example, with an added image, if the size of the base image (e.g., head or face of the user) increases by a particular percentage (e.g., 5%), the size of the added image (e.g., antlers) also increases by the same percentage (e.g., 5%). Conversely, if the size of the base image decreases by a particular percentage, the size of the added image also decreases by the same percentage.

In one embodiment, system 102 rotates an added image based on the frame. For example, if a given user rotates relative to the user's camera, the user's face would also rotate relative to the video window. System 102 rotates the added image accordingly. In other words, if the orientation of the base image (e.g., head or face of the user) rotates by a particular number of degrees (e.g., 30 degrees to the left or right), the added image (e.g., antlers) also rotates by the same number of degrees in the same direction (e.g., 30 degrees to the left or right).

In one embodiment, system 102 may crop an added media content item (e.g., added image) based on the frame. For example, if system 102 shows antlers on the head of another end-user being relatively close to the top of the video window, the antlers may not fit in the video window. As such, system 102 would crop the top of the antlers accordingly. Similarly, if video content such as sleigh 410 moves off the screen, system 102 may crop the video as sleigh 410 moves off the screen.

In other example embodiments, the remote user may not want the media content item to be cropped and may want to the media content item to remain within the frame. For example, in a game application where an image is a score board that is added to the frame, the score board should not be cropped. In one embodiment, system 102 may keep the image in one the same place on the screen (e.g., upper right-hand corner, bottom center, etc.). In one embodiment, system 102 may adjust the position of the image based on the frame, but keep the image in the frame. For example, if the image is a text bubble, system 102 may adjust the position of the text bubble to follow the face of the associated end-user. If the end-user were to stand up, causing the face of the end-user to move up relative to the video window, the text bubble would also move up but would stop at the top edge of the video window.

In one embodiment, system 102 may adjust the video graphics array (VGA) of the added image based on the VGA of the frame. In one embodiment, system 102 would scale the VGA of the added image up or down in order to match the VGA of the frame. For example, if the antler image in the example above had a VGA of 640×480, and the frame had a VGA 320×180, system 102 may scale the VGA of the antler image to 320×180 so that they match.

In one embodiment, system 102 may add an image to one or more frames by overlaying the image on the one or more frames. In another embodiment, system 102 may add an image to one or more frames by replacing at least a portion of the one or more frames with the image.

In one embodiment, system 102 may add an image to one or more frames that include an avatar. Such an embodiment may be implemented if the end-user does not have a video camera available. System 102 may transmit an avatar in lieu of a video of the actual face of an end-user. System 102 may overlay a portion of the frame or replace a portion of the frame (e.g., the mouth portion of the avatar) with an image of a mouth, where the image of the mouth moves and synchronizes with the voice of the end-user. In other words, the mouth lip syncs with the speaking voice of the end-user. In one embodiment, the mouth may open by different amounts based on the audio level in the audio stream.

In one embodiment, a given user may elect to use an avatar even if the given user has a video camera available. In various embodiments, system 102 or any third-party application may provide one or more avatars for the user to select. In one embodiment, if there are multiple avatars, system 102 may provide the user with a menu of avatars to select.

Note that the images of end-users U2, U4, U6, and U8 shown in respective video windows 302, 304, 306, and 308 of FIGS. 3 and 4 are conceptual and represent realistic images of end-users. Any one of these images may also represent an avatar.

As indicated above, the media content items added to the video stream may also include video content. For example, in one embodiment, system 102 may obtain one or more video files, and may add video content from the one or more video files to the media stream based on one or more parameters. In various embodiments, system 102 may obtain the one or more video files from a memory or library of system 102, from the Internet, or any other location. System 102 may also obtain the one or more video files from a third-party application or an end-user (e.g., end-users U2, U4, U6, and U8).

Referring again to FIG. 4, in an example implementation, the video content may include sleigh 410 being pulled by reindeer, and the remote user may set parameters associated with the video content. As indicated above, the remote user may be a third-party developer or an end-user. In one embodiment, the remote user may set parameters such that sleigh 410 is to be pulled across a video window when an end-user selects a button 330 in a multi-user video conference. In one embodiment, after selecting the appropriate button 330, system 102 may allow the end-user to select which video windows are to display the video content (e.g., via a pull-down menu or any suitable selection mechanism). For example, in FIG. 4, the end-user may choose to display sleigh 410 in main video window 316 and the video window (e.g., video window 306) corresponding to the end-user (e.g., end-user U6) being displayed in main video window 316. In another example, the end-user may choose to display sleigh 410 in any video window associated with a particular end-user (e.g., main video window 316 and video window 306 associated with end-user U6).

In one embodiment, system 102 may add video content to the media stream by overlaying the video content into a video stream. In another embodiment, system 102 may add video content to the media stream by replacing at least a portion of a video stream with the video content.

In one embodiment, system 102 may enable an end-user to specify which other end-users see the video content. For example, an end-user (e.g., end-user U2) may select a control button 330 so that all end-users (e.g., end-users U2, U4, U6, and U8) see the video content (e.g., sleigh 410). Alternatively, the end-user (e.g., end-user U2) may select a control button 330 so that selected end-users (e.g., end-users U2 and U4) see the video content. In one embodiment, if a control button 330 for adding video content is selected, system 102 may display a drop-down menu (or any suitable selection mechanism) listing all end-users currently participating in the multi-user video conference. The end-user who selected the control button may then select which end-users can see the video content.

In a given embodiment the system may allow the end-user to add any combination of image, audio, or video content to the media stream.

In one embodiment, system 102 may also obtain one or more audio files, and may add audio content from the one or more audio files to the media stream based on the one or more parameters.

Figure 5:
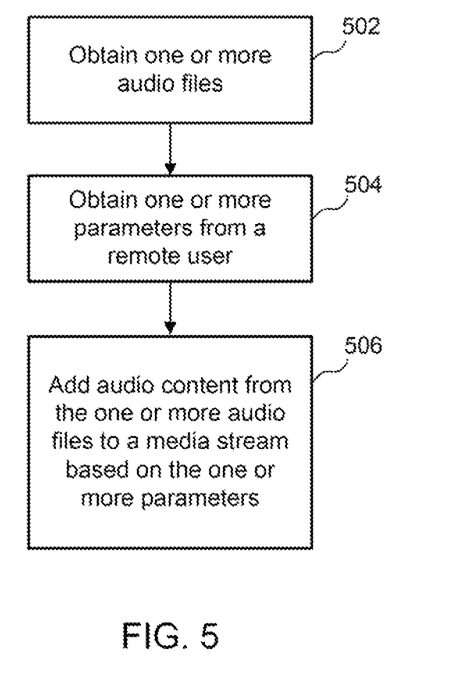
FIG. 5 illustrates an example simplified flow diagram for increasing end-user engagement in a social network, according to one embodiment.

FIG. 5 illustrates an example simplified flow diagram for increasing end-user engagement in a social network, according to one embodiment. Referring to both FIGS. 1 and 5, the method is initiated in block 502, where system 102 obtains one or more audio files. In one embodiment, the one or more audio files are user-specified audio files that include user-specified audio content. In various embodiments, system 102 may obtain the one or more audio files from a memory or library of system 102, from the Internet, or any other location. System 102 may also obtain the one or more audio files from a third-party application or an end-user (e.g., end-users U2, U4, U6, and U8). In one embodiment, an end-user may provide the one or more audio files to system 102 using a third-party application or using an application provided by system 102. In an example implementation, audio content may include the sound of a chime, and the remote user may set parameters such that the chime sounds when an end-user enters a multi-user video conference.

In block 504, system 102 obtains one or more parameters from a remote user. In one embodiment, the remote user is a third-party developer. In one embodiment, the third-party developer may use a third-party application or an application provided by system 102 to transmit the one or more parameters to system 102. In one embodiment the remote user is an end-user. In one embodiment, the end-user may use a third-party application or an application provided by system 102 to transmit the one or more parameters to system 102.

In one embodiment, the one or more parameters may include one or more sound control parameters, trigger parameters, and special effects parameters. For example, the sound parameters may modify sound characteristics of the audio content. Such sound parameters may include, for example, pitch, loudness, and quality such as timbre. Trigger parameters may modify when and often a particular audio content item is played. For example, trigger parameters may enable looping of audio content. Special effects parameters may modify a sound such as the voice of an end-user during a multi-user video conference. For example, special effects parameters may change the voice of an end-user (e.g., lower, raise, speed up, slow down a users voice, etc.). These embodiments are some examples of how system 102 enables remote users such as third-party developers and end-users to control the one or more parameters, which in turn control how and when audio content is played.

In block 506, system 102 may add audio content from the at least one audio file to a media stream based on the one or more parameters. As indicated above, in one embodiment, system 102 adds the audio content in real-time during a multi-user video conference. In one embodiment, system 102 may add audio content from two or more different audio files to a media stream based on the one or more parameters. For example, the two or more different audio files may include chimes, ringing sleigh bells, music, etc. As indicated above, the media stream may include one or more outbound streams and/or one or more inbound streams. In various embodiments, the media stream may be a media stream in a multi-user video conference. In one embodiment, system 102 may add audio content to the media stream by mixing the audio content into an audio stream. In another embodiment, system 102 may add audio content to the media stream by replacing at least a portion of an audio stream with the audio content.

Although the steps, operations, or computations may be presented in a specific order, the order may be changed in particular embodiments. Other orderings of the steps are possible, depending on the particular implementation. In some particular embodiments, multiple steps shown as sequential in this specification may be performed at the same time.

In one embodiment, system 102 may enable an end-user to specify which other end-users hear the audio content. In one embodiment, system 102 may enable an end-user to select a control button 330 that enables all end-users to hear the audio content. For example, an end-user (e.g., end-user U2) may select a control button 330 so that all end-users (e.g., end-users U2, U4, U6, and U8) hear the audio content. In one embodiment, system 102 may enable an end-user to select a control button 330 that enables particular end-users to hear the audio content. For example, the end-user (e.g., end-user U2) may select a control button 330 so that selected end-users (e.g., end-users U2 and U4) hear the audio content. In one embodiment, if a control button 330 for adding sound is selected, system 102 may display a drop-down menu (or any suitable selection mechanism) listing all end-users currently participating in the multi-user video conference. The end-user who selected the control button may then select which end-users can hear the audio content.

In one embodiment, system 102 may enable an end-user to create one or more groups of end-users. These groups are user-specified such that an end-user can associate one or more other end-users with each group and give each group a label (e.g., a family group, a friends group, a co-workers group, etc.). As such, a given group may be a subset of all end-users. Also, a given end-user may be associated with one or more groups. In one embodiment, system 102 may enable an end-user to select a control button 330 that enables one or more of the groups to hear the audio content. Accordingly, in a given multi-user video conference, different groups of end-users may hear different audio content based on end-user selections.

In one embodiment, system 102 may also obtain one or more media content items in addition to audio content. In one embodiment, the one or more media content items may include one or more images (e.g., antlers). In one embodiment, the one or more media content items may include two or more different images (e.g., antlers and a mustache). In one embodiment, the one or more media content items may include one or more videos (e.g., a video of a sled flying in the background).

In one embodiment, system 102 may add the one or more media content items to the media stream based on the one or more parameters. In various embodiments, system 102 may add any one more different types of media content (e.g., an audio content item, an image content item, a video content item, or any combination thereof) to the same media stream. Also, in one embodiment, system 102 may add the any number of media content items of any of these media content types to the same media stream. For example, in one embodiment, the one or more parameters may specify that particular audio content be played in combination with one or more particular actions. In one embodiment, such actions may include an end-user selecting a particular control button 330. For example, if an end-user selects a control button 330 to add a media content item (e.g., mustache, eye glasses, hat, etc.), system 102 may cause a user-specified (e.g., chime, ring, etc.) to sound when the media content is added. For example, a bell may ring when a mustache is added to the face of an end-user, etc.

In one embodiment, the one or more parameters may specify that particular audio content be played in combination with one or more particular actions associated with an image or a video content. Such actions may include an image changing (e.g., a number incrementing). For example, a bell may ring when a score on a scoreboard reaches a certain number, etc. Such actions may include particular movements in a video. For example, bells may ring whenever a particular end-user moves their head, etc.

As indicated above, developers such as third-party developers and end-users may provide different types of media content (e.g., images, video content, and audio content) may provide associated parameters to add such media content to media streams. In one embodiment, a third-party developer may write applications such as games for use in a multi-user video conference. Such games may be used by end-users to add images such as icons, score boards, locations of users, and other informational images to frames of video streams or to play humorous sound effects through audio streams of the multi-user video conference. In another example application, system 102 may enable end-users in a multi-user video conference to throw objects such as pies at each other, trying to hit each other's faces before they duck out of the way. In one embodiment, a successful hit may result in a "splat" sound.

In another example, system 102 may operate with applications having seasonal themes. For example, system 102 may enable end-users to choose to have reindeer antlers/nose during the month of December. In another example, system 102 may enable end-users to choose to have a mustache added during the month of November. In yet another example, system 102 may enable end-users to enable a Santa's beard, mix audio of holiday music, and have reindeer pull a sleigh across the stream.

Embodiments described herein provide various benefits. For example, enabling end-users in a multi-user video conferencing system to alter the video and/or audio streams increases engagement of the end-users in the video conference. Embodiments described herein also increase overall engagement among end-users in a social networking environment.

While system 102 is described as performing the steps as described in the embodiments herein, any suitable component or combination of components of system 102 or any suitable processor or processors associated with system 102 may perform the steps described.

Figure 6:
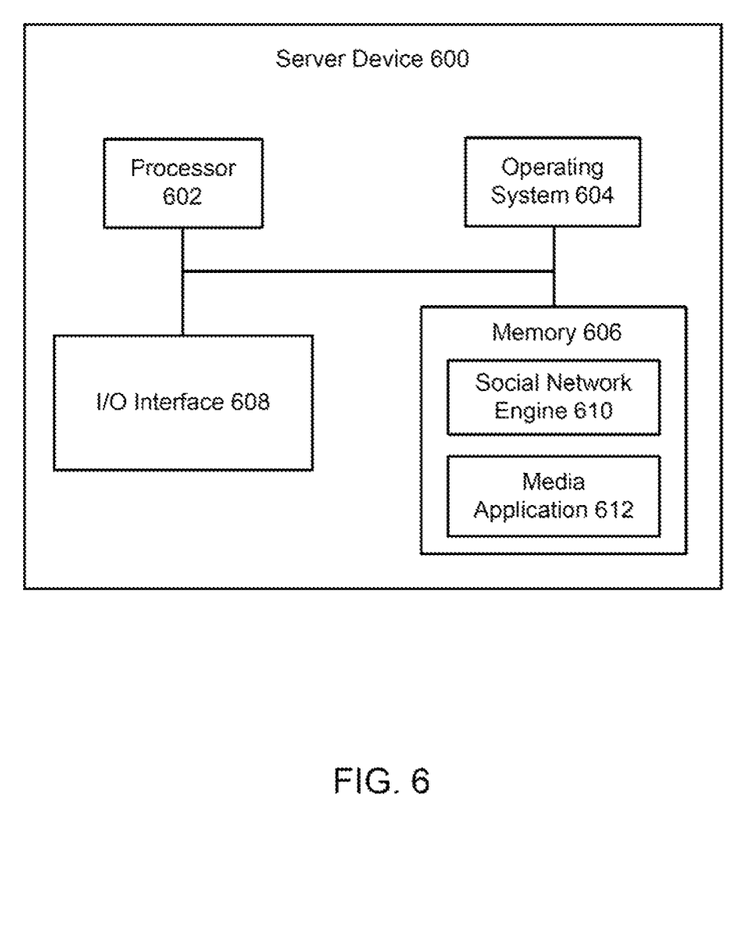
FIG. 6 is a block diagram of an example server device, which may be used to implement the embodiments described herein.

FIG. 6 is a block diagram of an example server device 600, which may be used to implement the embodiments described herein. For example, server device 600 may be used to implement server device 104 of FIG. 1, as well as to perform the method embodiments described herein. In one embodiment, server device 600 includes a processor 602, an operating system 604, a memory 606, and input/output (I/O) interface 608. Server device 600 also includes a social network engine 610 and a media application 612, which may be stored in memory 606 or on any other suitable storage location or computer-readable medium. Media application 612 provides instructions that enable processor 602 to perform the functions described herein and other functions.

For ease of illustration, FIG. 6 shows one block for each of processor 602, operating system 604, memory 606, social network engine 610, media application 612, and I/O interface 608. These blocks 602, 604, 606, 608, 610, and 612 may represent multiple processors, operating systems, memories, I/O interfaces, social network engines, and media applications. In other embodiments, server device 600 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

Any suitable programming language and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A method comprising:
    obtaining at least one user-specified audio file, wherein the at least one user-specified audio file is obtained from one of a server, a third-party application, and an end-user;
    obtaining one or more sound parameters from a remote user;
    adding user-specified audio content from the at least one user-specified audio file to a media stream based on the one or more sound parameters, wherein the media stream includes one or more of a video stream, an audio stream, an outbound stream, and an inbound stream, wherein the adding of the user-specified audio content is performed in real-time during a multi-user video conference, wherein the adding of the user-specified audio content comprises one of mixing the user-specified audio content into the audio stream and replacing at least a portion of the audio stream with the user-specified audio content, and wherein the at least one user-specified audio file and the one or more sound parameters are preloaded prior to the adding of the audio content to the media stream; and obtaining one or more special effect parameters, wherein the one or more special effects parameters modify a voice of an end-user.

2. A method comprising:
obtaining at least one audio file;
obtaining one or more sound parameters from a remote user;
adding user-specified audio content from the at least one audio file to a media stream based on the one or more sound parameters, wherein the adding of the user-specified audio content is performed in real-time during a multi-user video conference, wherein the adding of the user-specified audio content comprises replacing at least a portion of the media stream with the user-specified audio content; and obtaining one or more special effect parameters, wherein the one or more special effects parameters modify a voice of an end-user.

3. The method of claim 2, further comprising obtaining one or more trigger parameters that modify when a particular audio content is played, wherein the one or more trigger parameters also enable looping of audio content.

4. The method of claim 2, further comprising enabling an end-user to specify one or more user-specified groups of end-users that hear the user-specified audio content.

5. The method of claim 2, wherein the media stream includes one or more of a video stream, an audio stream, an outbound stream, and an inbound stream.

6. The method of claim 2, wherein the at least one audio file is obtained from one of a server, a third-party application, and an end-user.

7. The method of claim 2, wherein the adding of the user-specified audio content comprises mixing the user-specified audio content into an audio stream.

8. The method of claim 2, wherein the one or more sound parameters comprise one or more of pitch, loudness, and quality.

9. The method of claim 2, further comprising preloading the at least one audio file and the one or more sound parameters prior to the adding of the user-specified audio content to the media stream.

10. The method of claim 2, further comprising:
obtaining at least one media content item, wherein the at least one media content item includes audio content; and
adding the at least one media content item to the media stream based on the one or more sound parameters.

11. The method of claim 2, further comprising:
obtaining at least one media content item, wherein the at least one media content item includes at least one video content item; and
adding the at least one media content item to the media stream based on the one or more sound parameters.

12. The method of claim 2, enabling the user-specified audio content to be played in combination with at least one action associated with at least one of an image and a video content item.

13. A system comprising:
one or more processors; and
logic encoded in one or more tangible media for execution by the one or more processors and when executed operable to perform operations comprising:
obtaining at least one audio file;
obtaining one or more sound parameters from a remote user;
adding user-specified audio content from the at least one audio file to a media stream based on the one or more sound parameters, wherein the adding of the user-specified audio content is performed in real-time during a multi-user video conference, wherein the adding of the user-specified audio content comprises replacing at least a portion of the media stream with the user-specified audio content; and obtaining one or more special effect parameters, wherein the one or more special effects parameters modify a voice of an end-user.

14. The system of claim 13, wherein the logic when executed is further operable to enable an end-user to specify one or more other end-users that hear the user-specified audio content.

15. The system of claim 13, wherein the logic when executed is further operable to enable an end-user to specify one or more user-specified groups of end-users that hear the user-specified audio content.

16. The system of claim 13, wherein the at least one audio file comprises two or more different audio files.

17. The system of claim 13, wherein the media stream includes one or more of a video stream, an audio stream, an outbound stream, and an inbound stream.

18. The system of claim 13, wherein the at least one audio file is obtained from one of a server, a third-party application, and an end-user.

19. The system of claim 13, comprising:
obtaining at least one media content item, wherein the at least one media content item includes audio content; and
adding the at least one media content item to the media stream based on the one or more sound parameters.

\* \* \* \* \*